(12) United States Patent
Kobayashi et al.

(10) Patent No.: US 10,300,409 B2
(45) Date of Patent: May 28, 2019

(54) HIGH-DENSITY FINE BUBBLE-CONTAINING LIQUID PRODUCING METHOD AND HIGH-DENSITY FINE BUBBLE-CONTAINING LIQUID PRODUCING APPARATUS

(71) Applicant: IDEC CORPORATION, Osaka-shi, Osaka (JP)

(72) Inventors: Hideaki Kobayashi, Osaka (JP); Masakazu Kashiwa, Osaka (JP)

(73) Assignee: IDEC CORPORATION (JP)

( * ) Notice: Subject to any disclaimer, the term of this patent is extended or adjusted under 35 U.S.C. 154(b) by 0 days.

(21) Appl. No.: 15/676,022

(22) Filed: Aug. 14, 2017

(65) Prior Publication Data

US 2017/0340991 A1 Nov. 30, 2017

Related U.S. Application Data

(63) Continuation of application No. 14/760,714, filed as application No. PCT/JP2014/050426 on Jan. 14, 2014, now Pat. No. 9,764,254.

(30) Foreign Application Priority Data

Jan. 17, 2013 (JP) ................................. 2013-006481

(51) Int. Cl.
*B01D 19/00* (2006.01)
*B01F 3/04* (2006.01)
(Continued)

(52) U.S. Cl.
CPC ......... *B01D 19/0031* (2013.01); *B01D 19/00* (2013.01); *B01D 19/0036* (2013.01);
(Continued)

(58) Field of Classification Search
CPC .......................... B01D 19/0031; B01D 19/00; B01D 19/0036; B01F 3/04; B01F 3/04007; B01F 3/04021; B01F 3/04049; B01F 3/04063
(Continued)

(56) References Cited

U.S. PATENT DOCUMENTS

| 5,845,993 A | 12/1998 | Shirtum et al. ............... 366/348 |
| 2009/0117241 A1 | 5/2009 | Tsuji ............................. 426/460 |

(Continued)

FOREIGN PATENT DOCUMENTS

| CN | 201445923 U | 5/2010 |
| CN | 102755846 A | 10/2012 |

(Continued)

OTHER PUBLICATIONS

"Development of ultra high density nano-bubbles generation system by nanoGALF technology and its application to precision cleaning", Aug. 9, 2012, <URL:http://jp.idec.com/cms/pdf/usr/technology/tech_resources/09/JSMP_2012_01.pdf>.

(Continued)

*Primary Examiner* — Robert A Hopkins
(74) *Attorney, Agent, or Firm* — Ostrolenk Faber LLP

(57) ABSTRACT

Initial liquid containing fine bubbles is produced by mixing water and air (step S11). Fine bubbles have diameters of less than 1 μm. The density of bubbles in the initial liquid is measured (step S13), and when the measured density is less than a target density (step S14), the initial liquid is heated and reduced in pressure so that the liquid is vaporized (step S15). As a volume of the liquid decreases, the density of fine bubbles increases, and high-density fine bubble-containing liquid is easily obtained. Alternatively, by increasing the density of fine bubbles in the initial liquid with using a filter that does not pass all fine bubbles, high-density fine bubble-containing liquid is easily acquired (step S15). When the (Continued)

density of bubbles in the initial liquid is greater than the target density, the initial liquid is diluted (step S16).

6 Claims, 8 Drawing Sheets

(51) Int. Cl.
*B01D 43/00* (2006.01)
*B01F 5/04* (2006.01)
*B01F 5/10* (2006.01)
*C02F 1/04* (2006.01)
*C02F 1/44* (2006.01)
*B01F 3/22* (2006.01)
*B01F 15/00* (2006.01)
*C02F 1/74* (2006.01)
*C02F 103/02* (2006.01)

(52) U.S. Cl.
CPC ......... *B01D 19/0068* (2013.01); *B01D 43/00* (2013.01); *B01F 3/0446* (2013.01); *B01F 3/04063* (2013.01); *B01F 3/04439* (2013.01); *B01F 3/04503* (2013.01); *B01F 3/04744* (2013.01); *B01F 3/04836* (2013.01); *B01F 3/04985* (2013.01); *B01F 3/2246* (2013.01); *B01F 3/2284* (2013.01); *B01F 5/0413* (2013.01); *B01F 5/0428* (2013.01); *B01F 5/10* (2013.01); *B01F 5/106* (2013.01); *B01F 15/00233* (2013.01); *B01F 15/00396* (2013.01); *C02F 1/04* (2013.01); *C02F 1/444* (2013.01); *B01F 2003/04858* (2013.01); *C02F 1/74* (2013.01); *C02F 2103/02* (2013.01); *C02F 2209/40* (2013.01); *C02F 2303/00* (2013.01); *C02F 2303/26* (2013.01)

(58) Field of Classification Search
USPC .......... 261/78.2, 141; 95/241, 247, 250, 251
See application file for complete search history.

(56) References Cited

U.S. PATENT DOCUMENTS

| 2009/0273103 | A1 | 11/2009 | Watanabe | 261/5 |
|---|---|---|---|---|
| 2009/0293920 | A1 | 12/2009 | Watanabe | 134/102.1 |
| 2011/0000436 | A1 | 1/2011 | Jang et al. | 119/253 |
| 2012/0236678 | A1 | 9/2012 | Gordon | 366/108 |

FOREIGN PATENT DOCUMENTS

| JP | H10-263563 | | 10/1998 |
|---|---|---|---|
| JP | 2001-259615 | | 9/2001 |
| JP | 2003-062579 | | 3/2003 |
| JP | 2003-154242 | | 5/2003 |
| JP | 2004-261314 | | 9/2004 |
| JP | 2006-272096 | A | 10/2006 |
| JP | 2007-258367 | A | 10/2007 |
| JP | 2007260497 | A | 10/2007 |
| JP | 4129290 | | 5/2008 |
| JP | 2008-168290 | | 7/2008 |
| JP | 2008-246311 | | 10/2008 |
| JP | 2009-119385 | | 6/2009 |
| JP | 2009-119385 | A | 6/2009 |
| JP | 2009-233551 | | 10/2009 |
| JP | 2009-291681 | A | 12/2009 |
| JP | 2011-131117 | A | 7/2011 |
| JP | 2011-240218 | A | 12/2011 |
| JP | 2012-106166 | | 6/2012 |
| JP | 2012-157789 | | 8/2012 |
| KR | 10-2005-0029155 | | 3/2005 |
| TW | 313531 | | 8/1997 |
| WO | WO 2007/034912 | A1 | 3/2007 |

OTHER PUBLICATIONS

The catalog of "Nano-bubbles Producing Apparatus FZ1N-02 (nanoGALF)", [online], May 23, 2011, IDEC Corporation, [searched on Dec. 20, 2011], Internet <URL: http://www.idec.com/jpja/products/dldata/pdf_b/P1383-0.pdf> (English research paper titled "Generation of High Density Nano-Bubbles by nanoGALF Technology and Laser Induced Quantitative Measurement" is attached) This English research paper explains the contents of the above catalog.

"Exploratory reseach for nanobubbles produced by shearing of gas-liquid mixture", Koichi Terasaka et al., Aug. 2011, p. 424-425 (English abstract).

PCT/IB/326 Notification Concerning Transmittal of International Preliminary Report on Patentability including PCT/IB/373 and PCT/ISA/237 dated Jul. 30, 2015 for corresponding PCT/JP2014/050426.

PCT/IB/338 Notification of Transmittal of Translation of the International Preliminary Report on Patentability including PCT/IB/373 and PCT/ISA/237 dated Jul. 30, 2015 for corresponding PCT/JP2014/050426.

Wang, Xian-fu, "Cavitating and Supercavitating Flows Theory and Applications," *National Defense Industry Press*, China, Feb. 2009 (English translations of the brief introduction and digest by computer).

DIAMETER OF BUBBLES

DIAMETER OF BUBBLES

HIGH-DENSITY FINE BUBBLE-CONTAINING LIQUID PRODUCING METHOD AND HIGH-DENSITY FINE BUBBLE-CONTAINING LIQUID PRODUCING APPARATUS

CROSS-REFERENCE TO RELATED APPLICATIONS

This application is a continuation of U.S. patent application Ser. No. 14/760,714, filed Jul. 14, 2015, which is a 35 U.S.C. §§ 371 national phase conversion of PCT/JP2014/050426, filed Jan. 14, 2014, which claims priority to Japanese Patent Application No. 2013-006481, filed Jan. 17, 2013, the contents of both of which are incorporated herein by reference. The PCT International Application was published in the Japanese language.

TECHNICAL FIELD

The present invention relates to a technique for producing liquid that contains fine bubbles.

BACKGROUND ART

In recent years, techniques for producing water containing fine bubbles have been studied actively. For example, online catalog "Nanobubble Generator FZ1N-02" (May 23, 2011, IDEC, Corporation retrieved on Dec. 20, 2011, Internet <URL: http://www.idec.com/jpja/products/dldata/pdf_b/P1383-0.pdf>) discloses an apparatus for generating a lot of fine bubbles. Furthermore, Koichi TERASAKA and five others report in "Study on Analysis of Nanobubbles Generated by Gas-Liquid Mixture Shearing Method" (Proceedings of Annual Meeting 2011 of the Japanese Society for Multiphase Flow, Executive Committee of Annual Meeting 2011 (Kyoto) of the Japanese Society for Multiphase Flow, August 2011, pp. 424-425) that fine bubbles are stable in water.

There are various techniques for generating fine bubbles. As one example, in a fine bubble generating apparatus disclosed in Japanese Patent No. 4129290, a gas-liquid mixed fluid is swirled at high speed in a fluid swirling chamber so that the shearing force produced in the swirl flow reduces the sizes of bubbles.

Water containing fine bubbles has thus far been generated by mixing water and air mechanically. The number of fine bubbles generated by mechanical mixing is currently approximately in the range of one hundred million to one billion bubbles per milliliter (bubbles/mL). The number of fine bubbles per unit volume is increasing with advances in technology, but we cannot expect a dramatic increase in a short term. Meanwhile, increasing the density of fine bubbles is important for research on applications of liquid that contains fine bubbles and to increase the efficiency of handling liquid that contains fine bubbles.

SUMMARY OF INVENTION

An object of the present invention is to easily produce liquid that contains high-density fine bubbles.

A high-density fine bubble-containing liquid producing method according to an aspect of the present invention includes the step of preparing initial liquid containing fine bubbles and the step of vaporizing part of the initial liquid to obtain high-density fine bubble-containing liquid.

A high-density fine bubble-containing liquid producing method according to another aspect of the present invention includes the step of preparing initial liquid containing fine bubbles and the step of passing part of the initial liquid through a filtration filter to obtain high-density fine bubble-containing liquid that is a remainder of the initial liquid.

According to the present invention, it is possible to easily produce liquid that contains high-density fine bubbles.

The present invention is also intended for a high-density bubble-containing liquid producing method.

These and other objects, features, aspects and advantages will become more apparent from the following detailed description of the present invention when taken in conjunction with the accompanying drawings.

BRIEF DESCRIPTION OF DRAWINGS

FIG. 8.B illustrates a relationship between the diameter and the density of bubbles in high-density fine bubble-containing liquid;
FIG. 9.B is an image of fine bubbles after concentration.

DESCRIPTION OF EMBODIMENTS

Figure 1:
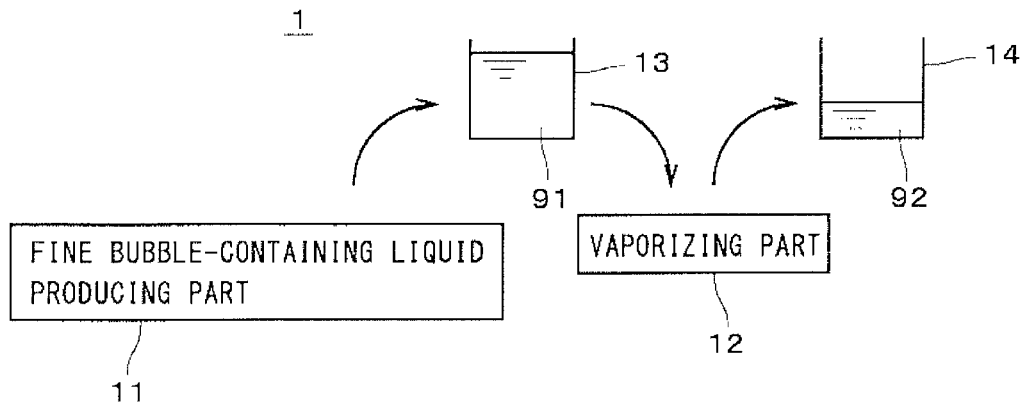
FIG. 1 illustrates a schematic configuration of a high-density fine bubble-containing liquid producing apparatus.
Figure 2:
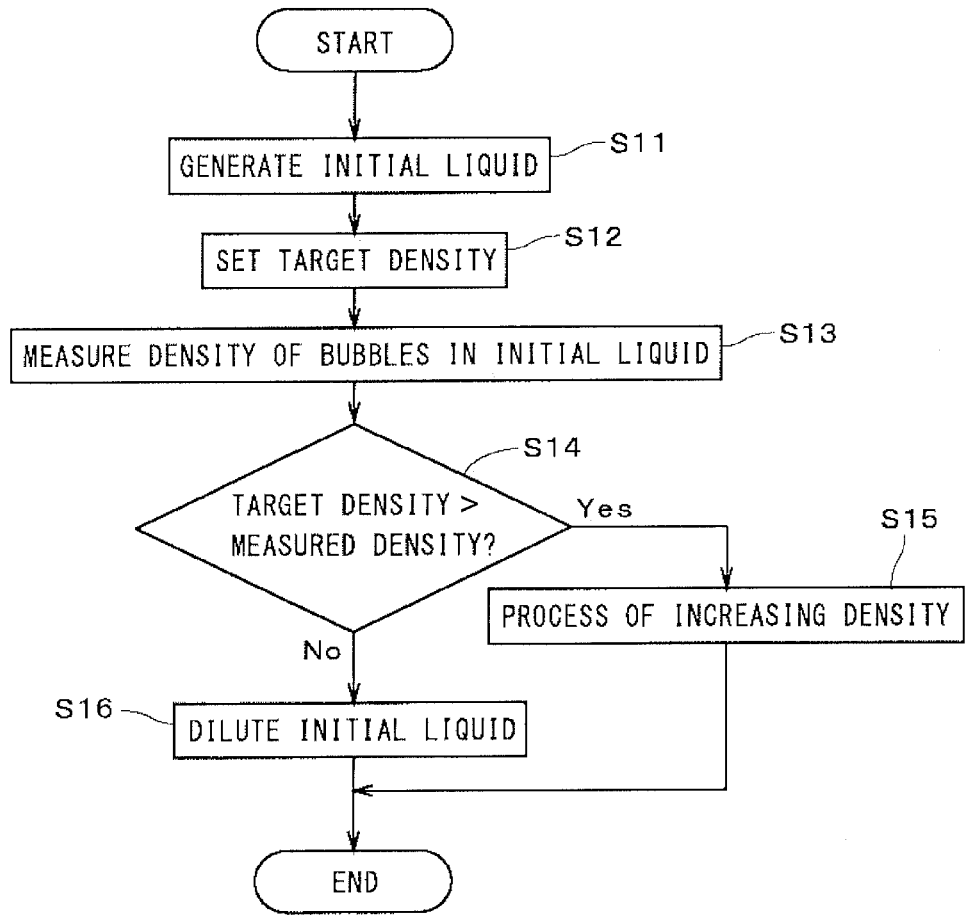
FIG. 2 is a flowchart of producing fine bubble-containing liquid.

FIG. 1 illustrates a schematic configuration of a high-density fine bubble-containing liquid producing apparatus 1 according to an embodiment of the present invention. FIG. 2 illustrates a process of producing liquid (hereinafter, referred to as "fine bubble-containing liquid") that contains a desired density of fine bubbles. FIG. 2 includes a process (step S15) of producing liquid (hereinafter, referred to as "high-density fine bubble-containing liquid") that contains high-density fine bubbles. The high-density fine bubble-containing liquid producing apparatus 1 includes a fine bubble-containing liquid producing part 11, a vaporizing part 12, a first reservoir 13, and a second reservoir 14. The fine bubble-containing liquid producing part 11 mixes water and air mechanically to produce liquid 91 that contains fine bubbles, which are termed as "ultrafine bubbles" (step S11). Ultrafine bubbles are also termed as "nanobubbles." This liquid 91 is hereinafter referred to as "initial liquid." The initial liquid 91 is stored in the first reservoir 13.

The term "fine bubbles" as used in the present embodiment refers to bubbles having diameters of less than 1 μm. However, since in actuality a large number of fine bubbles with diameters of less than 500 μm are generated, "fine bubbles" as used in the present embodiment may be defined as bubbles with diameters of less than 500 μm. The "density" of fine bubbles refers to the number of fine bubbles contained per unit volume of liquid.

When the initial liquid 91 is prepared, an operator sets the density of fine bubbles in the fine bubble-containing liquid to be obtained (step S12). This density is hereinafter referred to as a "target density." The target density may be determined before the initial liquid 91 is generated. The operator measures the density of bubbles in the initial liquid 91 (step S13). When the density of bubbles in the initial liquid 91 is less than the target density (step S14), the initial liquid 91 is conveyed to the vaporizing part 12. The vaporizing part 12 vaporizes part of the initial liquid 91 to acquire high-density fine bubble-containing liquid 92 (step S15). As will be described later, this partial vaporization does not greatly change the number of bubbles in the fine bubble-containing liquid. Thus, the amount of the liquid to be vaporized by the vaporizing part 12 can be calculated in advance. The high-density fine bubble-containing liquid 92 is stored in the second reservoir 14.

When the density of bubbles in the initial liquid 91 is greater than or equal to the target density, liquid that does not contain fine bubbles is added to the initial liquid 91 to dilute the initial liquid 91 (step S16). This reduces the density of bubbles in the fine bubble-containing liquid. In this case as well, the amount of the liquid to be added can be calculated in advance. The vaporizing part 12 is not used when the density of bubbles in the initial liquid 91 is greater than or equal to the target density. More precisely, steps S15 and S16 are not executed when a difference between the density of bubbles in the initial liquid 91 and the target density is within a tolerance.

Figure 3:
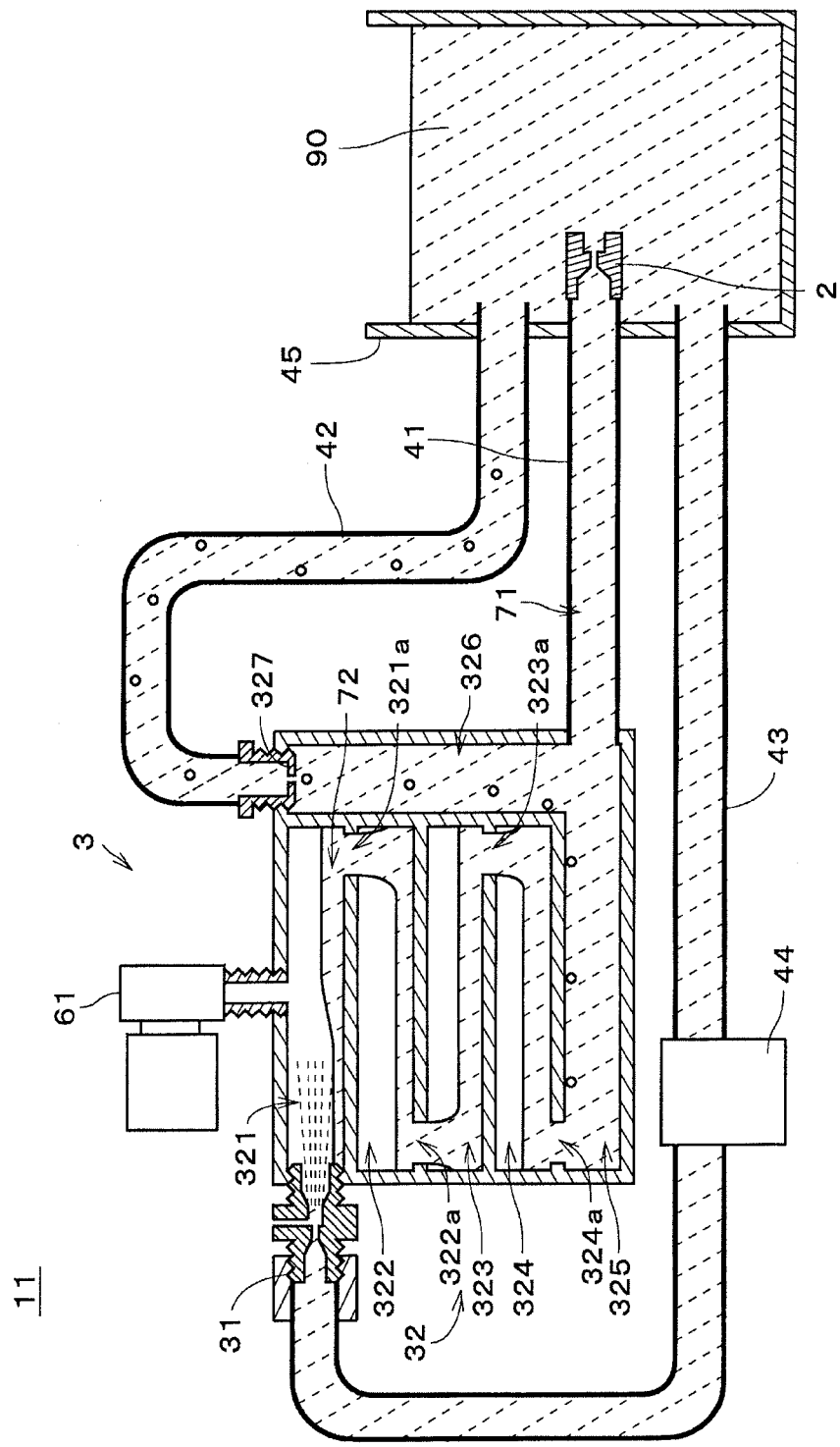
FIG. 3 is a cross-sectional view of a fine bubble-containing liquid producing part.

FIG. 3 illustrates the fine bubble-containing liquid producing part 11. The fine bubble-containing liquid producing part 11 mixes gas and liquid to produce liquid that contains fine bubbles of the gas. In the present embodiment, water is used as pre-mixing target liquid 90, and air is used as gas to be mixed with water. The fine bubble-containing liquid producing part 11 includes a fine-bubble generating nozzle 2, a pressurized-liquid producing part 3, delivery tube 41, auxiliary tube 42, return tube 43, a pump 44, and a liquid reservoir 45. The liquid reservoir 45 stores the target liquid 90. The target liquid 90 is changed into the initial liquid 91 by operating the fine bubble-containing liquid producing part 11.

The delivery tube 41 connects the pressurized-liquid producing part 3 and the fine-bubble generating nozzle 2. The pressurized-liquid producing part 3 produces pressurized liquid 71 in which gas has been dissolved under pressure, and supplies the produced liquid to the fine-bubble generating nozzle 2 through the delivery tube 41. An outlet of the fine-bubble generating nozzle 2 is located inside the liquid reservoir 45, and the delivery tube 41 substantially connects the pressurized-liquid producing part 3 and the liquid reservoir 45.

Ejection of the pressurized liquid 71 from the fine-bubble generating nozzle 2 into the target liquid 90 generates fine bubbles in the target liquid 90. In the present embodiment, fine bubbles of air are generated in the target liquid 90. In FIG. 3, fluids such as the target liquid 90 are diagonally hatched with broken lines to facilitate comprehension.

Like the delivery tube 41, the auxiliary tube 42 connects the pressurized-liquid producing part 3 and the liquid reservoir 45. The auxiliary tube 42 guides liquid that is discharged along with excess gas when the excess gas is separated by the pressurized-liquid producing part 3 to the liquid reservoir 45. The return tube 43 is provided with the pump 44, and the pump 44 returns the target liquid 90 from the liquid reservoir 45 to the pressurized-liquid producing part 3 through the return tube 43.

The pressurized-liquid producing part 3 includes a mixing nozzle 31 and a pressurized-liquid producing container 32. Air flows from a gas inlet of the mixing nozzle 31 through a regulator, a flowmeter, and the like. The mixing nozzle 31 mixes the liquid pumped by the pump 44 with the air and ejects the mixture into the pressurized-liquid producing container 32.

The interior of the pressurized-liquid producing container 32 is pressurized to a state (hereinafter referred to as a "pressurized environment") in which pressure is higher than atmospheric pressure. The gas-liquid mixed fluid (hereinafter, referred to as a "mixed fluid 72") ejected from the mixing nozzle 31 flows through the pressurized-liquid producing container 32 in the pressurized environment, and during this time, changes into the pressurized liquid 71 in which the gas is dissolved in the liquid under pressure.

Figure 4:
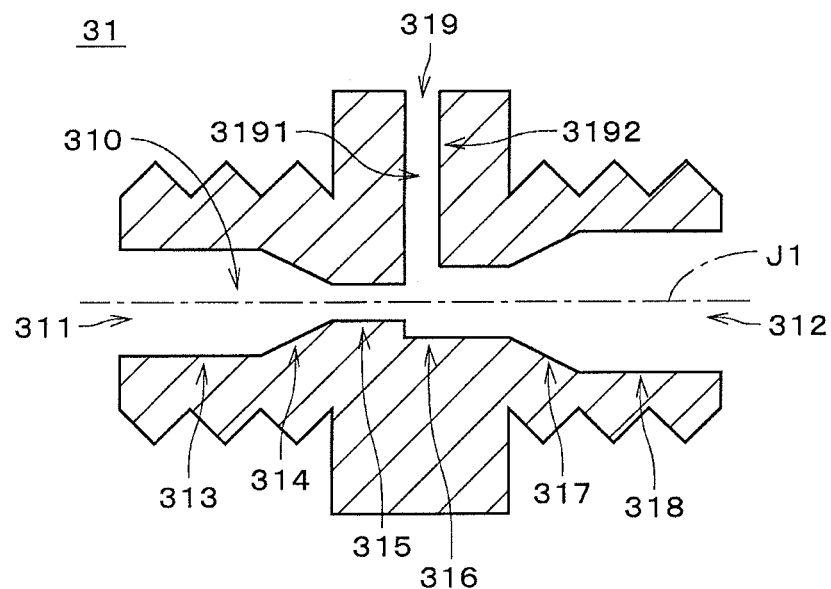
FIG. 4 is a cross-sectional view of a mixing nozzle.

FIG. 4 is an enlarged cross-sectional view of the mixing nozzle 31. The mixing nozzle 31 includes a liquid inlet 311 through which the liquid pumped by the aforementioned pump 44 flows, a gas inlet 319 through which the gas flows, and a mixed-fluid outlet 312 through which the mixed fluid 72 is ejected. The mixed fluid 72 is generated by mixing the liquid flowing from the liquid inlet 311 and the gas flowing from the gas inlet 319. The liquid inlet 311, the gas inlet 319, and the mixed-fluid outlet 312 each have a generally circular shape. A passage cross-section of a nozzle passage 310 from the liquid inlet 311 toward the mixed-fluid outlet 312 and a passage cross-section of a gas passage 3191 from the gas inlet 319 toward the nozzle passage 310 also have generally circular shapes. The term "passage cross-section" refers to a cross-section that is perpendicular to the central axis of a passage such as the nozzle passage 310 and the gas passage 3191, i.e., a cross-section that is perpendicular to the flow of a fluid flowing through the passage. Also, the area of the passage cross-section is referred to as a "passage area" in the following description. The nozzle passage 310 is in the shape of a venturi tube whose passage area decreases in the middle portion of the passage.

The mixing nozzle 31 includes a lead-in part 313, a first tapered part 314, a throat part 315, a gas mixing part 316, a second tapered part 317, and a lead-out part 318 that are arranged sequentially in order from the liquid inlet 311 toward the mixed-fluid outlet 312. The mixing nozzle 31 also includes a gas supply part 3192 in which the gas passage 3191 is provided.

The lead-in part 313 has a passage area that is approximately constant at each position in the direction of a central axis J1 of the nozzle passage 310. The first tapered part 314 has a passage area that gradually decreases in the direction of flow of the liquid (i.e., toward the downstream side). The throat part 315 has an approximately constant passage area. The passage area of the throat part 315 is the smallest in the nozzle passage 310. Note that even if the throat part 315 has a passage area that changes slightly, the entire portion of the nozzle passage 310 where the passage area is roughly the smallest is regarded as the throat part 315. The gas mixing part 316 has a passage area that is approximately constant and slightly larger than the passage area of the throat part 315. The second tapered part 317 has a passage area that gradually increases toward the downstream side. The lead-out part 318 has an approximately constant passage area. The gas passage 3191 also has an approximately constant passage area, and the gas passage 3191 is connected to the gas mixing part 316 of the nozzle passage 310.

In the mixing nozzle 31, the liquid flowing into the nozzle passage 310 from the liquid inlet 311 is caused to accelerate in the throat part 315 and decreases the static pressure, so that in the throat part 315 and the gas mixing part 316, the pressure inside the nozzle passage 310 falls to lower than atmospheric pressure. Accordingly, the gas is drawn by suction from the gas inlet 319, passes through the gas passage 3191 into the gas mixing part 316, and is mixed with the liquid to generate the mixed fluid 72. The mixed fluid 72 is caused to decelerate in the second tapered part 317 and the lead-out part 318 and increases the static pressure, so that the mixed fluid 72 is ejected through the mixed-fluid outlet 312 into the pressurized-liquid producing container 32.

As illustrated in FIG. 3, the pressurized-liquid producing container 32 includes a first passage 321, a second passage 322, a third passage 323, a fourth passage 324, and a fifth passage 325 that are stacked in the up-down direction. In the following description, the first passage 321, the second passage 322, the third passage 323, the fourth passage 324, and the fifth passage 325 are referred to as "passages 321 to 325" when they are collectively indicated. The passages 321 to 325 are pipelines that extend in the horizontal direction, and cross-sections of the passages 321 to 325 that are perpendicular to the length of the passages have approximately rectangular shapes. In the present embodiment, the passages 321 to 325 have widths of approximately 40 mm.

The upstream end (i.e., the end on the left side in FIG. 3) of the first passage 321 is attached to the mixing nozzle 31, and the mixed fluid 72 ejected from the mixing nozzle 31 flows toward the right side in FIG. 3 in the pressurized environment. In the present embodiment, the mixed fluid 72 is ejected from the mixing nozzle 31 at a position above the liquid surface of the mixed fluid 72 in the first passage 321, and the mixed fluid 72 immediately after the ejection collides directly with the liquid surface before colliding with the downstream wall surface (i.e., the wall surface on the right side in FIG. 3) of the first passage 321. In order to cause the mixed fluid 72 ejected from the mixing nozzle 31 to collide directly with the liquid surface, the length of the first passage 321 is preferably 7.5 times greater than a vertical distance between the center of the mixed-fluid outlet 312 (see FIG. 4) of the mixing nozzle 31 and the lower surface of the first passage 321.

In the pressurized-liquid producing part 3, the mixed-fluid outlet 312 of the mixing nozzle 31 may be located partially or entirely below the liquid surface of the mixed fluid 72 in the first passage 321. In the first passage 321, the mixed fluid 72 that has just been ejected from the mixing nozzle 31 thus collides directly with the mixed fluid 72 flowing in the first passage 321, similar to as described above.

The lower surface at the downstream end of the first passage 321 has an approximately circular opening 321a, and the mixed fluid 72 flowing in the first passage 321 drops through the opening 321a into the second passage 322 located below the first passage 321. In the second passage 322, the mixed fluid 72 that has dropped from the first passage 321 flows from the right side to the left side in FIG. 3 in the pressurized environment and drops through an approximately circular opening 322a that is formed in the lower surface at the downstream end of the second passage 322 into the third passage 323 located below the second passage 322. In the third passage 323, the mixed fluid 72 that has dropped from the second passage 322 flows from the left side to the right side in FIG. 3 in the pressurized environment and drops through an approximately circular opening 323a that is formed in the lower surface at the downstream end of the third passage 323 into the fourth passage 324 located below the third passage 323. As illustrated in FIG. 3, in the first to fourth passages 321 to 324, the mixed fluid 72 is separated into a liquid layer containing bubbles and a gas layer located above the liquid layer.

In the fourth passage 324, the mixed fluid 72 that has dropped from the third passage 323 flows from the right side to the left side in FIG. 3 in the pressurized environment and flows (i.e., drops) through an approximately circular opening 324a that is formed in the lower surface at the downstream end of the fourth passage 324 into the fifth passage 325 located below the fourth passage 324. In the fifth passage 325, different from the first to fourth passages 321 to 324, no gas layer exists and the fifth passage 325 is in a state where liquid is filled, and bubbles are slightly present in the liquid in the vicinity of the upper surface of the fifth passage 325. In the fifth passage 325, the mixed fluid 72 that has flowed from the fourth passage 324 flows from the left side to the right side in FIG. 3 in the pressurized environment.

In the pressurized-liquid producing part 3, the gas is gradually dissolved under pressure in the liquid within the mixed fluid 72 that flows down from top to bottom in the passages 321 to 325 of the pressurized-liquid producing container 32 while accelerating and decelerating in stages (i.e., flows while repeatedly alternately flowing horizontally and flowing downward). In the fifth passage 325, the concentration of the gas dissolved in the liquid is approximately 60 to 90% of the (saturated) solubility of that gas in the pressurized environment. Then, excess gas that was not dissolved in the liquid exists in the fifth passage 325 as bubbles having visually recognizable sizes.

The pressurized-liquid producing container 32 further includes an excess-gas separating part 326 that extends upward from the upper surface on the downstream side of the fifth passage 325, and the excess-gas separating part 326 is filled with the mixed fluid 72. A cross-section that is perpendicular to the up-down direction of the excess-gas separating part 326 has an approximately rectangular shape, and the upper end of the excess-gas separating part 326 is connected to the auxiliary tube 42 via a throttle part 327 for pressure adjustment. Bubbles in the mixed fluid 72 flowing in the fifth passage 325 rise up through the excess-gas separating part 326 and flow along with part of the mixed fluid 72 into the auxiliary tube 42.

By separating excess gas in the mixed fluid 72 along with part of the mixed fluid 72 in this way, the pressurized liquid 71 that substantially does not contain at least bubbles having sizes that can be easily visually recognized is generated and sent to the delivery tube 41 connected to the downstream end of the fifth passage 325. In the present embodiment, gas which is approximately two or more times more than (saturated) solubility under atmospheric pressure is dissolved in the pressurized liquid 71. The liquid in the mixed fluid 72 flowing in the passages 321 to 325 of the pressurized-liquid producing container 32 can also be regarded as the pressurized liquid 71 that is in the process of being produced. The mixed fluid 72 that has flowed into the auxiliary tube 42 is guided to the target liquid 90 stored in the liquid reservoir 45. The auxiliary tube 42 functions as an auxiliary passage used to prevent a decrease in the target liquid 90 when the pump 44 is run for a long time.

An exhaust valve 61 is also provided above the first passage 321. The exhaust valve 61 is opened when the pump 44 is stopped, and prevents the mixed fluid 72 from flowing back to the mixing nozzle 31.

Figure 5:
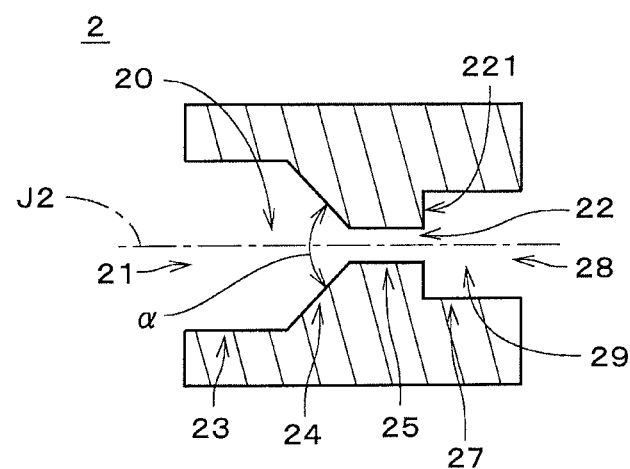
FIG. 5 is a cross-sectional view of a fine-bubble generating nozzle.

FIG. 5 is an enlarged cross-sectional view of the fine-bubble generating nozzle 2. The fine-bubble generating nozzle 2 includes a pressurized-liquid inlet 21 into which the pressurized liquid 71 flows from the delivery tube 41, and a pressurized-liquid outlet 22 that is open to the target liquid 90. The pressurized-liquid inlet 21 and the pressurized-liquid outlet 22 each have an approximately circular shape, and the passage cross-section of a nozzle passage 20 from the pressurized-liquid inlet 21 to the pressurized-liquid outlet 22 also has an approximately circular shape.

The fine-bubble generating nozzle 2 includes a lead-in part 23, a tapered part 24, and a throat part 25 that are arranged sequentially in order from the pressurized-liquid inlet 21 to the pressurized-liquid outlet 22. The lead-in part 23 has a passage area that is approximately constant at each position in the direction of a central axis J2 of the nozzle passage 20. The tapered part 24 has a passage area that gradually decreases in the direction of flow of the pressurized liquid 71 (i.e., to the downstream side). The inner surface of the tapered part 24 is part of an approximately circular conical surface centered on the central axis J2 of the nozzle passage 20. An angle α formed by the inner surface of the tapered part 24 is preferably greater than or equal to 10° and less than or equal to 90° in a cross-section that includes the central axis J2.

The throat part 25 communicates the tapered part 24 with the pressurized-liquid outlet 22. The inner surface of the throat part 25 is an approximately cylindrical surface, and the passage area of the throat part 25 is approximately constant. The diameter of the passage cross-section in the throat part 25 is the smallest in the nozzle passage 20, and the passage area of the throat part 25 is the smallest in the nozzle passage 20. The length of the throat part 25 is preferably greater than or equal to 1.1 times the diameter of the throat part 25 and less than or equal to 10 times the diameter thereof, and more preferably greater than or equal to 1.5 times the diameter of the throat part 25 and less than or equal to 2 times the diameter thereof. Note that even if the throat part 25 has a passage area that changes slightly, the entire portion of the nozzle passage 20 where the passage area is roughly the smallest is regarded as the throat part 25.

The fine-bubble generating nozzle 2 further includes an enlarged part 27 that is continuously formed from the throat part 25 and surrounds the pressurized-liquid outlet 22 while being spaced from the pressurized-liquid outlet 22, and an enlarged-part opening 28 formed at the end of the enlarged part 27. A passage 29 between the pressurized-liquid outlet 22 and the enlarged-part opening 28 is a passage provided outside the pressurized-liquid outlet 22 and is hereinafter referred to as an "external passage 29." The passage cross-sections of the external passage 29 and the enlarged-part opening 28 have approximately circular shapes, and the passage area of the external passage 29 is approximately constant. The diameter of the external passage 29 is larger than the diameter of the throat part 25 (i.e., the diameter of the pressurized-liquid outlet 22).

In the following description, an annular surface between the edge of the inner peripheral surface of the enlarged part 27 on the pressurized-liquid outlet 22 side and the edge of the pressurized-liquid outlet 22 is referred to as an "outlet end surface 221." In the present embodiment, an angle formed by the central axis J2 of both the nozzle passage 20 and the external passage 29 and the outlet end surface 221 is approximately 90°. The diameter of the external passage 29 is in the range of 10 to 20 mm, and the length of the external passage 29 is approximately equal to the diameter of the external passage 29. It can be considered that, in the fine-bubble generating nozzle 2, the external passage 29 which is a recessed part is formed at the end opposite the pressurized-liquid inlet 21, and the pressurized-liquid outlet 22 that is an opening smaller than the bottom of the recessed part is formed in the bottom of the recessed part. The enlarged part 27 enlarges the area of passage of the pressurized liquid 71 between the pressurized-liquid outlet 22 and the target liquid 90 stored in the liquid reservoir 45.

In the fine-bubble generating nozzle 2, the pressurized liquid 71 that has flowed from the pressurized-liquid inlet 21 into the nozzle passage 20 flows toward the throat part 25 while being caused to gradually accelerate in the tapered part 24, passes through the throat part 25, and is ejected as a jet from the pressurized-liquid outlet 22. The velocity of flow of the pressurized liquid 71 in the throat part 25 is preferably in the range of 10 to 30 meters per second, and in the present embodiment, the velocity of flow is approximately 20 meters per second. Since the static pressure of the pressurized liquid 71 decreases in the throat part 25, the gas in the pressurized liquid 71 becomes supersaturated and is extracted as fine bubbles into the liquid. The fine bubbles pass along with the pressurized liquid 71 through the external passage 29 of the enlarged part 27 and are diffused into the target liquid 90 stored in the liquid reservoir 45. In the fine bubble generation nozzle 2, the extraction of fine bubbles occurs even while the pressurized liquid 71 passes through the external passage 29. The fine bubbles generated by the fine-bubble generating nozzle 2 are fine bubbles having diameters of less than 1 μm. Note that when the ejection of liquid and fine bubbles from the fine-bubble generating nozzle 2 is stopped, the external passage 29 is filled with the target liquid 90.

As described above, the fine-bubble generating nozzle 2 that includes the tapered part 24 whose passage area gradually decreases in the direction of flow of the pressurized liquid 71 and the throat part 25 whose passage area is the smallest in the nozzle passage 20 can generate a lot of fine bubbles, and in particular fine bubbles having diameters of less than 1 μm, in a stable manner. Measurement using NanoSight's (NanoSight Limited) LM10 or LM20 shows that the fine-bubble generating nozzle 2 generates one hundred million or more fine bubbles per milliliter (mL) in the target liquid 90, the fine bubbles having diameters that are distributed in the range of less than 1 μm centered on approximately 100 nm. This value is the number of fine bubbles generated without circulation of the target liquid. In the following description, the number of fine bubbles generated per milliliter by the fine-bubble generating nozzle 2 is referred to as a "fine-bubble generation density." In actuality, the fine-bubble generation density will increase if the target liquid is circulated many times.

The fine-bubble generating nozzle 2 that includes the enlarged part 27 surrounding the pressurized-liquid outlet 22 can reduce the influence of the flow of the target liquid 90 in the liquid reservoir 45 on the pressurized liquid 71 immediately after the ejection from the pressurized-liquid outlet 22. This stabilizes the extraction of fine bubbles even out of the pressurized liquid 71 immediately after the ejection from the pressurized-liquid outlet 22, thus making it possible to generate a lot of fine bubbles in a more stable manner.

As described above, in the fine-bubble generating nozzle 2, the inner surface of the tapered part 24 is part of the circular conical surface centered on the central axis J2 of the nozzle passage 20, and the angle α formed by the inner surface of the tapered part 24 is 90° or less in a cross-section that includes the central axis J2. Accordingly, a lot of fine bubbles can be generated in a more stable manner. From the viewpoint of reducing the length of the fine-bubble generating nozzle 2 while maintaining the diameters of the lead-in part 23 and the throat part 25 of the fine-bubble generating nozzle 2, the angle α formed by the inner surface of the tapered part 24 is preferably 10° or more.

In the fine-bubble generating nozzle 2, the length of the throat part 25 is greater than or equal to 1.1 times the diameter of the throat part 25 and less than or equal to 10 times the diameter thereof. When the length of the throat part 25 is greater than or equal to 1.1 times the diameter of the throat part 25, a lot of fine bubbles can be generated in a more stable manner. For example, although the fine-bubble generation density (without circulation) is approximately 56 million fine bubbles when the length of the throat part 25 is 0.53 times the diameter of the throat part 25, the fine-bubble generation density is approximately 110 million fine bubbles when the length of the throat part 25 is 1.57 times the diameter thereof. Moreover, when the length of the throat part 25 is less than or equal to 10 times the diameter thereof, it is possible to prevent resistance produced in the pressurized liquid 71 from excessively increasing in the throat part 25 and to make it easy to form the throat part 25 in high precision. From the viewpoint of generating a lot of fine bubbles in an even more stable manner, the length of the throat part 25 is more preferably greater than or equal to 1.5 times the diameter thereof and less than or equal to two times the diameter thereof.

The initial liquid 91 produced by the fine bubble-containing liquid producing part 11 is preferably liquid that contains 20 million or more fine bubbles per milliliter. Since it is preferable for the fine-bubble generation density to be high at the stage of the initial liquid 91, it is more preferable for the initial liquid 91 to contain one hundred million or more fine bubbles per milliliter.

Figure 6:
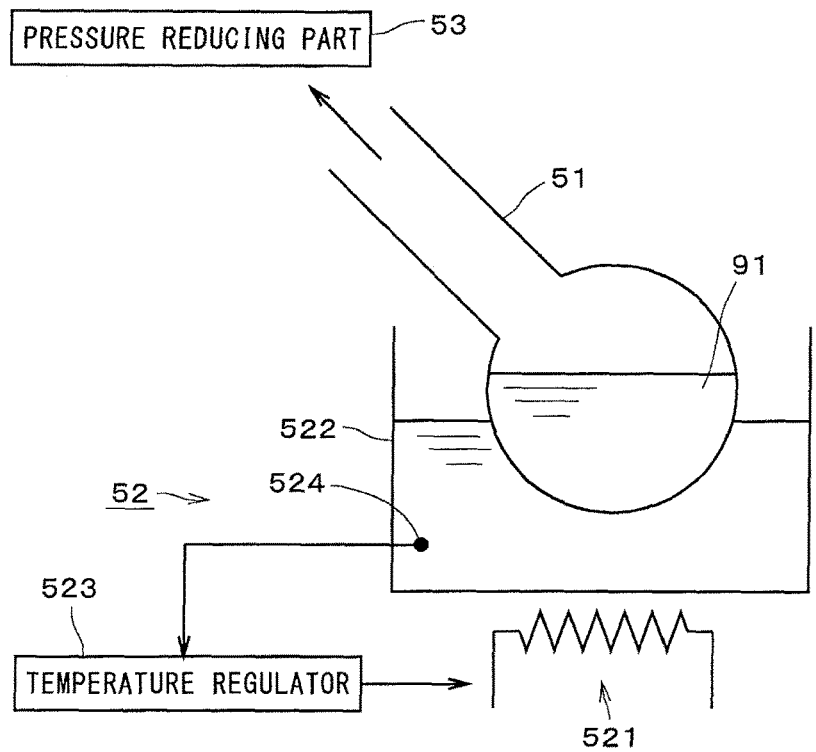
FIG. 6 illustrates a configuration of a vaporizing part.

FIG. 6 illustrates a configuration of the vaporizing part 12. The vaporizing part 12 includes a vaporizing container 51 into which the initial liquid 91 is poured, a heating part 52 for heating the vaporizing container 51, and a pressure reducing part 53. The heating part 52 includes a heater 521, a heating container 522, a temperature regulator 523, and a thermometer 524. The heating container 522 stores liquid such as water in advance. The vaporizing container 51 is put in the liquid stored in the heating container 522. In actuality, a rotator for rotating the vaporizing container 51 within the heating container 522 is further provided. The thermometer 524 for measuring the liquid temperature is disposed in the heating container 522. The temperature regulator 523 controls heat generation by the heater 521 with reference to a measured value received from the thermometer 524. Thus, the temperature in the vaporizing container 51 is kept constant. The pressure reducing part 53 reduces pressure inside the vaporizing container 51 to a set value.

When the initial liquid 91 is poured into the vaporizing container 51, the rotation of the vaporizing container 51 is started, and also the pressure reducing part 53 reduces pressure around the initial liquid 91 and the heating part 52 heats the initial liquid 91. At the initial stage, the pressure in the vaporizing container 51 is set to a value larger than a target value. For example, the interior of the vaporizing container 51 is kept at 150 mbar and 60° C. In the vaporizing container 51, deaeration from the initial liquid 91 occurs. Then, pressure is set to the target value, e.g., 70 mbar. Although slight boiling occurs immediately after the pressure around the initial liquid 91 is reduced to 70 mbar, this boiling will stop before long.

By keeping the above pressure and temperature, the vaporization of the initial liquid 91 continues without boiling. The volume of the initial liquid 91 gradually decreases, and the high-density fine bubble-containing liquid 92 is acquired. The reason why the density of fine bubbles is increased by vaporizing water without boiling is unknown, but the above-described technique enables easy acquisition of high-density fine bubble-containing liquid, which is not possible before. In addition, the pressure reducing and the heating improve the efficiency of vaporization.

Next, experimental results that verify the ability to acquire high-density fine bubble-containing liquid through vaporization will be described.

Figure 7:
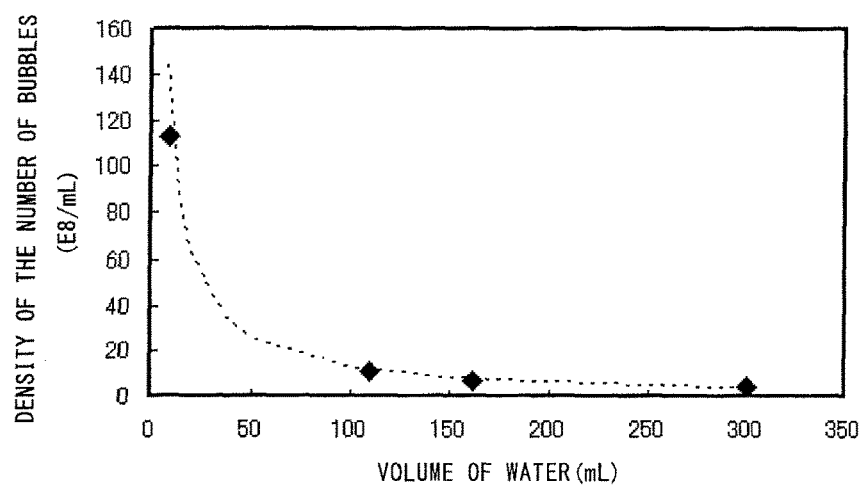
FIG. 7 illustrates a change in the density of fine bubbles.

FIG. 7 is a graph showing a change in the density of fine bubbles when the initial liquid is vaporized. Diamond-shaped dots indicate measured values. The broken line indicates theoretical values for the density of fine bubbles that increases with decreasing volume of the liquid, in the case where it is assumed that the total number of fine bubbles does not change. The measured values and the theoretical values coincide extremely closely with each other. This shows that the total number of fine bubbles does not decrease even if the volume of the liquid containing fine bubbles is reduced by vaporization. The graph also shows that high-density fine bubble-containing liquid that contains more than ten billion fine bubbles per milliliter can be easily acquired. Note that this measurement is conducted using NanoSight's NS500 after the liquid is diluted to 200 parts of ultrapure water.

Figure 8A:
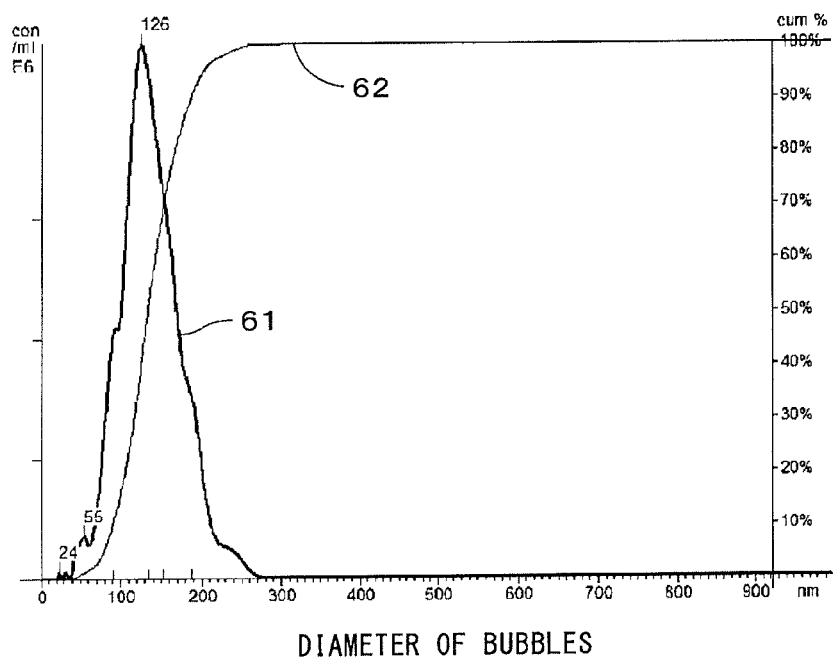
FIG. 8.A illustrates a relationship between the diameter and the density of bubbles in initial liquid.
Figure 8B:
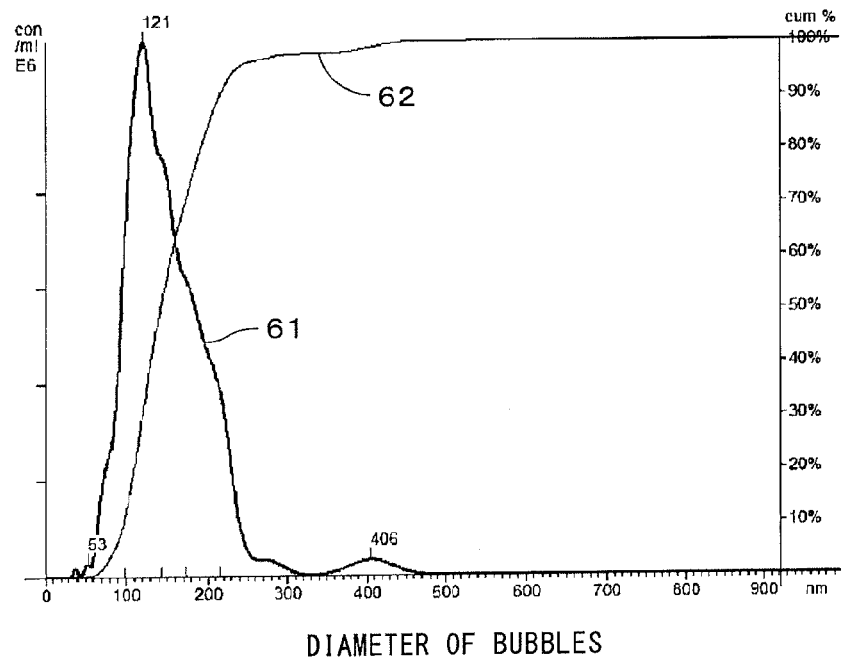

FIG. 8.A is a graph showing the results of measurement on the initial liquid using the aforementioned NanoSight's device, and FIG. 8.B is a graph showing the results of measurement after concentration. The aforementioned device conducts measurement using dynamic light scattering. Reference numeral 61 denotes the relationship between the diameter of bubbles and the number of bubbles per unit volume (density), and reference numeral 62 denotes the cumulative number of bubbles relative to the diameter of bubbles. The vertical axis is adjusted slightly to equate the heights of these graphs. Since the graphs have approximately the same shape, it can be estimated that the total number of fine bubbles does not change substantially even if water containing fine bubbles is vaporized.

Figure 9A:
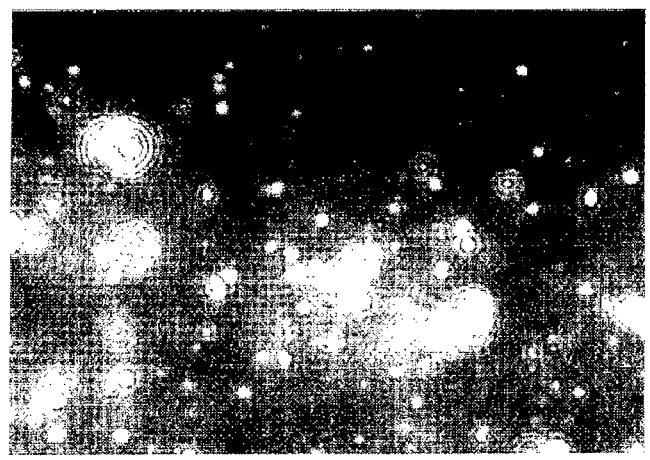
FIG. 9.A is an image of fine bubbles before concentration.
Figure 9B:
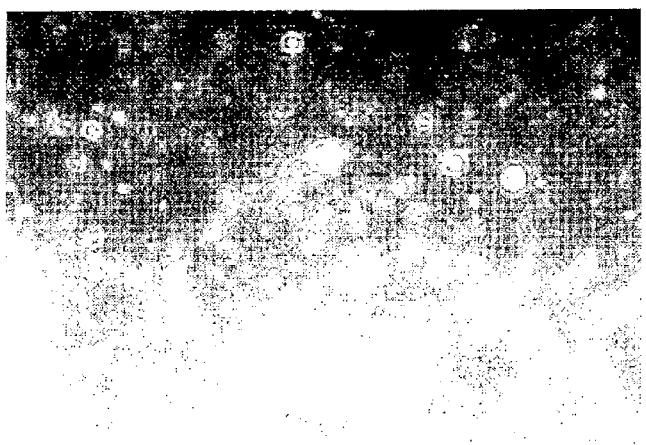

FIG. 9.A is an image of fine bubbles in the stage where the presence of 3.7 billion fine bubbles per milliliter has been measured. The Brownian movement of fine bubbles can be directly observed by irradiating the diluted liquid with later light. FIG. 9.B is an image of fine bubbles obtained by diluting the liquid in the same manner in the stage where the presence of 11 billion fine bubbles per milliliter has been measured. It can also be confirmed from these images that the density of fine bubbles has increased.

Figure 10:
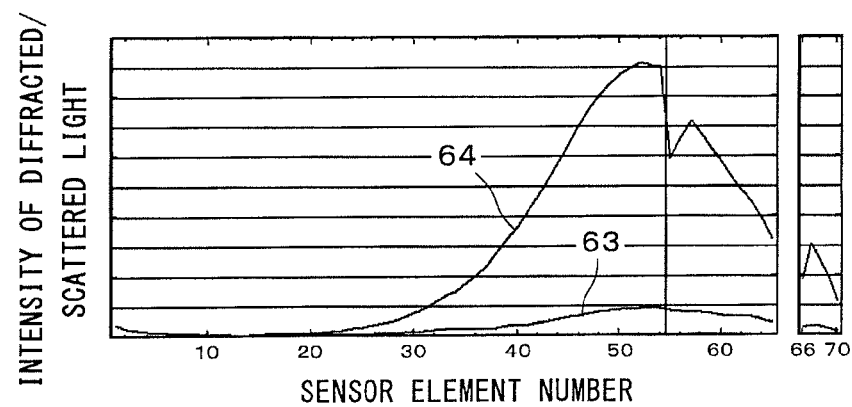
FIG. 10 illustrates the results of measurement using a laser diffraction/scattering method.

FIG. 10 is a graph showing the results of measurement using the laser diffraction/scattering method. Reference numeral 63 corresponds to the initial liquid 91, and reference numeral 64 corresponds to the high-density fine bubble-containing liquid 92. This measurement method can measure the density of fine bubbles without dilution. Values corresponding to sensor element numbers 66 to 70 are output values resulting from the number of fine bubbles. This measurement result also shows that the output value increases approximately ten-fold if the initial liquid is condensed to 10 times. Consequently, it can be found that the total number of fine bubbles does not decrease sharply even if part of the initial liquid 91 is vaporized.

Figure 11:
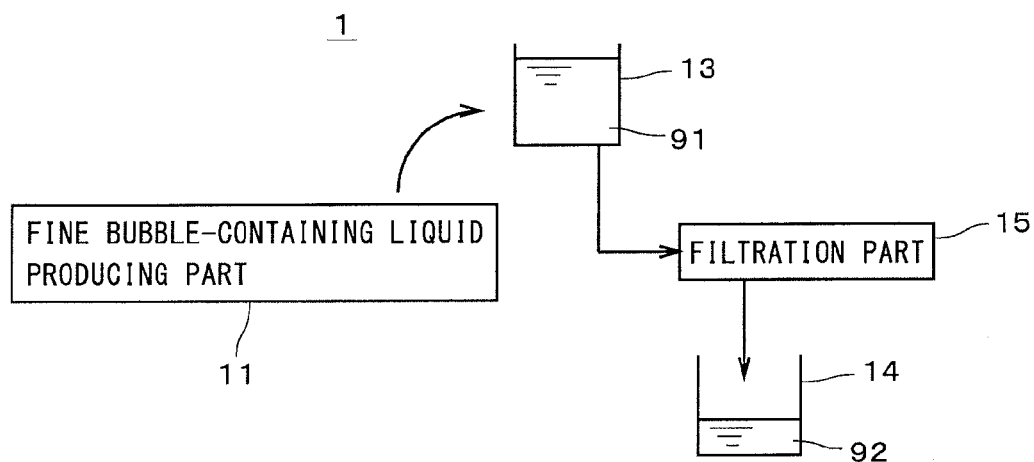
FIG. 11 illustrates another example of the high-density fine bubble-containing liquid producing apparatus.

FIG. 11 illustrates another example of the high-density fine bubble-containing liquid producing apparatus 1. The procedure of producing fine bubble-containing liquid is the same as in FIG. 2.

The high-density fine bubble-containing liquid producing apparatus 1 in FIG. 11 includes a fine bubble-containing liquid producing part 11, a filtration part 15. a first reservoir 13, and a second reservoir 14. The fine bubble-containing liquid producing part 11 is the same as in FIG. 1, and produces the initial liquid 91 (step S11). Then, a target density is set (step S12), and the density of bubbles in the initial liquid 91 is measured (step S13). When the density of bubbles in the initial liquid 91 is less than the target density (step S14), the initial liquid 91 is introduced from the first reservoir 13 into the filtration part 15 so that the high-density fine bubble-containing liquid 92 is obtained in the second reservoir 14 (step S15). When the density of bubbles in the initial liquid 91 is greater than or equal to the target density, liquid that does not contain bubbles is added to the initial liquid 91 to acquire fine bubble-containing liquid with the target density (step S16). In this case, the filtration part 15 is not used. More precisely, steps S15 and S16 are not executed when a difference between the density of bubbles in the initial liquid 91 and the target density is within a tolerance.

Figure 12:
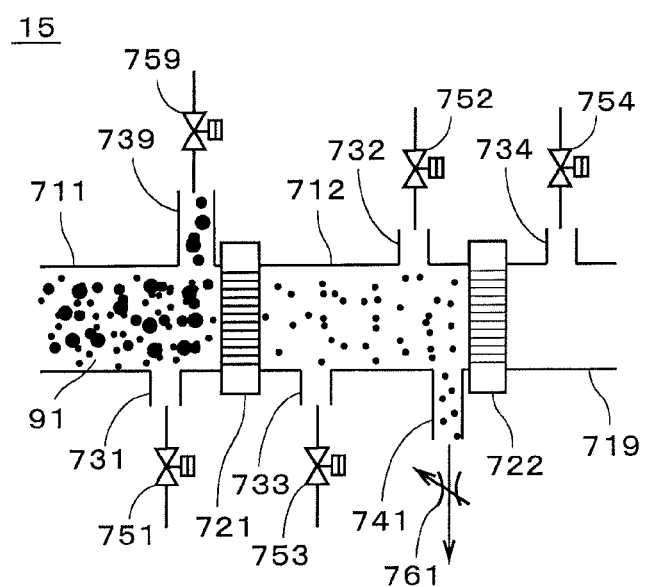
FIG. 12 illustrates a filtration part.

FIG. 12 illustrates the filtration part 15. The filtration part 15 includes a first intake passage 711, a second intake passage 712, a rear discharge passage 719, a first filter 721, and a second filter 722. The first filter 721 and the second filter 722 are filtration filters such as membrane filters, single-hole membranes, ultrafiltration filters, microfiltration membranes, or reverse osmosis membranes (the same applies to filters 721 to 723 in FIG. 13). The filters are, for example, characterized in that the first filter 721 does not pass fine bubbles whose diameters are larger than 200 nm and passes the other fine bubbles, and the second filter 722 does not pass fine bubbles whose diameters are larger than 60 nm and passes the other fine bubbles.

An unwanted-bubble exhaust passage 739 and a first cleaning outflow passage 731 are connected to the first intake passage 711. A fine bubble-containing liquid discharge passage 741, a first cleaning inflow passage 732, and a second cleaning outflow passage 733 are connected to the second intake passage 712. A second cleaning inflow passage 734 is connected to the rear discharge passage 719.

The unwanted-bubbles exhaust passage 739, the first cleaning outflow passage 731, the first cleaning inflow passage 732, the second cleaning outflow passage 733, and the second cleaning inflow passage 734 are respectively provided with valves 759 and 751 to 754. The fine bubble-containing liquid discharge passage 741 is provided with a throttle valve 761. The valves 759 and 751 to 754 are closed in a normal state.

The initial liquid 91 is guided from the first reservoir 13 through the first intake passage 711 to the first filter 721. The first filter 721 does not pass fine bubbles having large diameters, and only fine bubbles having small diameters are passed through the first filter 721 and guided to the second intake passage 712. Fine bubbles having large diameters flow to the unwanted-bubble exhaust passage 739. The valve 759 on the unwanted-bubble exhaust passage 739 is periodically opened and the gas accumulated in the unwanted-bubble exhaust passage 739 is exhausted.

The initial liquid 91 that has passed through the first filter 721 is guided through the second intake passage 712 to the second filter 722. The filtration size of the second filter 722 is smaller than that of the first filter 721. The second filter 722 does not pass most of the fine bubbles and passes substantially only the liquid. Note that the filtration size of the filter and the diameter of fine bubbles that are passed through the filter do not always equal.

A remainder of the initial liquid 91 left after part of the initial liquid 91 has passed through the second filter 722 is guided along with the fine bubbles to the fine bubble-containing liquid discharge passage 741. Consequently, high-density fine bubble-containing liquid that contains fine bubbles having diameters of 60 to 200 nm is discharged through the fine bubble-containing liquid discharge passage 741 to the second reservoir 14. As illustrated in FIG. 8.A, the fine bubble-containing liquid producing part 11 of the present embodiment generates fine bubbles whose diameters are mostly in the range of 60 to 200 nm. Thus, the density of bubbles in the high-density fine bubble-containing liquid is extremely high.

The liquid that has passed through the second filter 722 is discharged from the rear discharge passage 719. The liquid from the rear discharge passage 719 may be acquired as necessary as liquid that contains extremely fine bubbles. Here, the flow rate of the liquid passing through the second filter 722 is controlled by adjusting the degree of opening of the throttle valve 761. This enables the density of fine bubbles in the high-density fine bubble-containing liquid to be controlled to the target density. More specifically, the density of bubbles in the high-density fine bubble-containing liquid is measured at predetermined intervals, and the degree of opening of the throttle valve 761 is appropriately adjusted on the basis of the measurement result.

The filters are cleaned at regular intervals in the filtration part 15. In the case of cleaning the first filter 721, the inlet of the first intake passage 711 and the outlet of the rear discharge passage 719 are closed, the valves 751 and 752 of the first cleaning outflow passage 731 and the first cleaning inflow passage 732 are opened, and the other valves are closed. By passing cleaning liquid (e.g., pure water) from the first cleaning inflow passage 732 to the first cleaning outflow passage 731, substances adhering to the first filter 721 are discharged from the first cleaning outflow passage 731.

Similarly, in the case of cleaning the second filter 722, the inlet of the first intake passage 711 and the outlet of the rear discharge passage 719 are closed, the valves 753 and 754 of the second cleaning outflow passage 733 and the second cleaning inflow passage 734 are opened, and the other valves are closed. Cleaning liquid is passed from the second cleaning inflow passage 734 to the second cleaning outflow passage 733 so that substances adhering to the second filter 722 are discharged from the second cleaning outflow passage 733.

Use of the filters in the filtration part 15 enables easy and low-cost production of liquid that contains high-density fine bubbles.

Figure 13:
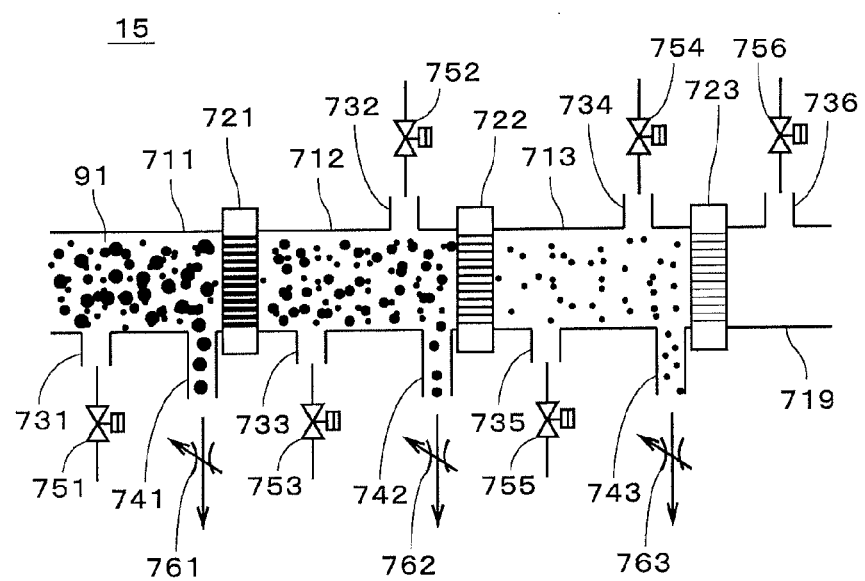
FIG. 13 illustrates another example of the filtration part.

FIG. 13 illustrates another example of the filtration part 15. The filtration part 15 can acquire a plurality of types of high-density fine bubble-containing liquid, each containing a different size of fine bubbles. In the example in FIG. 13, three types of high-density fine bubble-containing liquid that contain three different sizes of fine bubbles are respectively acquired in three second reservoirs 14 (not shown).

The filtration part 15 includes a first intake passage 711, a second intake passage 712, a third intake passage 713, a rear discharge passage 719, a first filter 721, a second filter 722, and a third filter 723. The first filter 721, the second filter 722, and the third filter 723 are filtration filters. For example, the first filter 721 does not pass fine bubbles whose diameters are larger than 500 nm, and passes the other fine bubbles. The second filter 722 does not pass fine bubbles whose diameters are larger than 200 nm, and passes the other fine bubbles. The third filter 723 does not pass fine bubbles whose diameters are larger than 60 nm, and passes the other fine bubbles.

A first cleaning outflow passage 731 and a first fine bubble-containing liquid discharge passage 741 are connected to the first intake passage 711. A first cleaning inflow passage 732, a second cleaning outflow passage 733, and a second fine bubble-containing liquid discharge passage 742 are connected to the second intake passage 712. A second cleaning inflow passage 734, a third cleaning outflow passage 735, and a third fine bubble-containing liquid discharge passage 743 are connected to the third intake passage 713. A third cleaning inflow passage 736 is connected to the rear discharge passage 719.

The first cleaning outflow passage 731, the first cleaning inflow passage 732, the second cleaning outflow passage 733, the second cleaning inflow passage 734, the third cleaning outflow passage 735, and the third cleaning inflow passage 736 are respectively provided with valves 751 to 756. The first fine bubble-containing liquid discharge passage 741, the second fine bubble-containing liquid discharge passage 742, and the third fine bubble-containing liquid discharge passage 743 are respectively provided with throttle valves 761 to 763. The valves 751 to 756 are closed in a normal state.

The initial liquid 91 is guided from the first reservoir 13 through the first intake passage 711 to the first filter 721. The first filter 721 does not pass fine bubbles having large diameters so that only fine bubbles having small diameters are passed through the first filter 721 and guided to the second intake passage 712. A remainder of the initial liquid 91 left after part of the initial liquid 91 has passed through the first filter 721 is guided along with the fine bubbles to the first fine bubble-containing liquid discharge passage 741. Consequently, high-density fine bubble-containing liquid is discharged from the first fine bubble-containing liquid discharge passage 741.

The initial liquid 91 (hereinafter, referred to as "filtrate") that has passed through the first filter 721 is guided through the second intake passage 712 to the second filter 722. The filtration size of the second filter 722 is smaller than that of the first filter 721. The second filter 722 does not pass fine bubbles having relatively large diameters. A remainder of the filtrate left after part of the filtrate transferred from the first filter 721 has passed through the second filter 722 is guided along with the fine bubbles to the second fine bubble-containing liquid discharge passage 742. Consequently, high-density fine bubble-containing liquid is discharged from the second fine bubble-containing liquid discharge passage 742.

The filtrate that has passed through the second filter 722 is guided through the third intake passage 713 to the third filter 723. The filtration size of the third filter 723 is smaller than that of the second filter 722. The third filter 723 does not pass most of the fine bubbles and passes substantially only the liquid. A remainder of the filtrate left after part of the filtrate has passed through the third filter 723 is guided along with the fine bubbles to the third fine bubble-containing liquid discharge passage 743. Consequently, high-density fine bubble-containing liquid is discharged from the third fine bubble-containing liquid discharge passage 743.

The liquid that has passed through the third filter 723 is discharged from the rear discharge passage 719. The liquid from the rear discharge passage 719 may be acquired as necessary as liquid that contain extremely fine bubbles. Through the above action, high-density fine bubble-containing liquid that contains the largest fine bubbles is discharged from the first fine bubble-containing liquid discharge passage 741, high-density fine bubble-containing liquid that contains the second largest fine bubbles is discharged from the second fine bubble-containing liquid discharge passage 742, and high-density fine bubble-containing liquid that contains the smallest fine bubbles is discharged from the third fine bubble-containing liquid discharge passage 743. These types of high-density fine bubble-containing liquid are respectively stored in the three second reservoirs 14.

Here, the flow rates of the liquid passing through the first to third filters 721 to 723 are controlled by adjusting the degrees of opening of the throttle valves 761 to 763. This enables control of the density of fine bubbles in each type of the high-density fine bubble-containing liquid. Note that, as with the case illustrated in FIG. 12, another filter may be further provided upstream to remove unwanted fine bubbles having extremely large diameters in advance from the unwanted-bubble exhaust passage.

The filters are cleaned at regular intervals in the filtration part 15. As with the case illustrated in FIG. 12, in the case of cleaning the first filter 721, the inlet of the first intake passage 711 and the outlet of the rear discharge passage 719 are closed, the valves 751 and 752 of the first cleaning outflow passage 731 and the first cleaning inflow passage 732 are opened, and the other valves are closed. By passing cleaning liquid (e.g., pure water) from the first cleaning inflow passage 732 to the first cleaning outflow passage 731, substances adhering to the first filter 721 are discharged from the first cleaning outflow passage 731.

Similarly, in the case of cleaning the second filter 722, the valves 753 and 754 of the second cleaning outflow passage 733 and the second cleaning inflow passage 734 are opened, and the other valves are closed. Cleaning liquid is passed from the second cleaning inflow passage 734 to the second cleaning outflow passage 733. In the case of cleaning the third filter 723, the valves 755 and 756 of the third cleaning outflow passage 735 and the third cleaning inflow passage 736 are opened, and the other valves are closed. Cleaning liquid is passed from the third cleaning inflow passage 736 to the third cleaning outflow passage 735.

Use of the filters in the filtration part 15 enables easy and low-cost production of liquid that contains high-density fine bubbles of the desired size.

While the above has been a description of the high-density fine bubble-containing liquid producing apparatus and the fine-bubble generating method, this technique can be modified in various ways.

The liquid to be mixed with the gas in the mixing nozzle 31 is not limited to pure water, and may be liquid that consists primarily of water. For example, additives or non-volatile liquid may be added to water. Alternatively, ethyl alcohol, for example, is also considered usable as the liquid. The gas that forms the fine bubbles is not limited to air, and may, for example, be nitrogen or other gas. However, it is necessary for the gas to be insoluble or poorly soluble in the liquid.

The structure of the fine bubble-containing liquid producing part 11 may be modified in various ways, and the fine bubble-containing liquid producing part 11 may have a different configuration. For example, the fine-bubble generating nozzle 2 may include a plurality of pressurized-liquid outlets 22. A pressure regulator valve may be provided between the fine-bubble generating nozzle 2 and the pressurized-liquid producing part 3 to keep the pressure applied to the fine-bubble generating nozzle 2 constant with high precision. The passages in the pressurized-liquid producing container 32 may have circular cross-sections. Other methods such as mechanical agitation may be used to mix the gas and the liquid.

The initial liquid 91 may be supplied from a third party by such as being purchased. The production and concentration of the initial liquid 91 may be conducted at geographically separate locations. In this case, the high-density fine bubble-containing liquid producing apparatus 1 does not need to include the fine bubble-containing liquid producing part 11.

The density of fine bubbles is increased by vaporization of the liquid, but boiling of the liquid is preferably avoided. It is, however, not necessary to completely avoid boiling, and slight boiling is allowable as long as the disappearance of fine bubbles can be suppressed. For example, boiling is allowable during part of the time required to vaporize the liquid, or in a very small part of the liquid. In other words, in step S15, part of the initial liquid 91 is vaporized without boiling to obtain the high-density fine bubble-containing liquid 92.

The filtration part 15 may use four or more filters having different filtration sizes. Depending on the quality of the initial liquid 91, the unwanted-bubble exhaust passage 739 may be appropriately omitted as illustrated in FIG. 13.

In the filtration part 15, the initial liquid 91 does not need to flow when supplied to the filters. For example, a filter may be provided in a lower portion of a reservoir and the initial liquid 91 is stored in it. High-density fine bubble-containing liquid is obtained above the filter after part of the initial liquid 91 passes through the filter.

High-density fine bubble-containing liquid may be used in various applications that have thus far been proposed for conventional fine bubble-containing liquid. High-density fine bubble-containing liquid may also be used in novel fields, and diverse fields of application are conceivable. Examples include food products, beverages, cosmetics, drugs, medical treatment, plant cultivation, semiconductor devices, flat panel displays, electronic equipment, solar cells, secondary batteries, materials with new functions, and removal of radioactive materials. In addition, the transportation cost of liquid that contains fine bubbles can be reduced by diluting the high-density fine bubble-containing liquid at the transportation destination.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

1 High-density fine bubble-containing liquid producing apparatus
11 Fine bubble-containing liquid producing part
12 Vaporizing part
13 First reservoir
15 Filtration part
91 Initial liquid
92 High-density fine bubble-containing liquid
711 First intake passage
712 Second intake passage
713 Third intake passage
721 First filter
722 Second filter
723 Third filter
741 (First) fine bubble-containing liquid discharge passage
742 Second fine bubble-containing liquid discharge passage
743 Third fine bubble-containing liquid discharge passage
S11 to S16 Step

The invention claimed is:

1. A high-density fine bubble-containing liquid producing method comprising:
   a) preparing initial liquid containing fine bubbles having diameters of less than 1 μm; and
   b) reducing volume of said initial liquid by vaporizing part of said initial liquid to obtain high-density fine bubble-containing liquid.

2. The high-density fine bubble-containing liquid producing method according to claim 1, wherein
   said initial liquid is heated and pressure around said initial liquid is reduced in said operation b).

3. The high-density fine bubble-containing liquid producing method according to claim 1, wherein
   said operation a) includes producing said initial liquid.

4. A high-density fine bubble-containing liquid producing apparatus comprising:
   a reservoir for storing initial liquid containing fine bubbles having diameters of less than 1 μm; and
   a vaporizing part for reducing volume of said initial liquid by vaporizing part of said initial liquid to obtain high-density fine bubble-containing liquid.

5. The high-density fine bubble-containing liquid producing apparatus according to claim 4, wherein
   said vaporizing part includes:
   a heating part for heating said initial liquid; and
   a pressure reducing part for reducing pressure around said initial liquid.

6. The high-density fine bubble-containing liquid producing apparatus according to claim 4, further comprising
   a fine bubble-containing liquid producing part for producing said initial liquid.

* * * * *